United States Patent [11] 3,597,927

| [72] | Inventor | Charles Wayne Hemphill<br>Lubbock, Tex. |
|---|---|---|
| [21] | Appl. No. | 572,520 |
| [22] | Filed | Aug. 15, 1966 |
| [45] | Patented | Aug. 10, 1971 |
| [73] | Assignee | Concentric Engineering Company<br>Dallas, Tex. |

[54] METHOD AND APPARATUS FOR DISPOSING OF REFUSE
2 Claims, 25 Drawing Figs.

[52] U.S. Cl. ................................................. 61/35,
214/83.3, 214/302, 214/518, 37/189
[51] Int. Cl. ........................................................ B60p 1/00,
B65f 3/02
[50] Field of Search .......................................... 37/103,
94—96, 189—90; 111/1, 14; 214/300—302; 47/1,
58

[56] References Cited
UNITED STATES PATENTS
1,023,571   4/1912   Lapin ........................... 37/103
3,277,850  10/1966   Jackson et al. .............. 111/14

Primary Examiner—Robert E. Bagwill
Attorney—Richards, Harris & Hubbard

ABSTRACT: Method and apparatus for collecting and disposing of refuse by collecting refuse from a multiplicity of garbage cans which are adapted to be automatically dumped into a compacting unit where the refuse is compacted into a bale. The bales are transported to a digging apparatus which provides a ditch by digging two parallel spaced-apart vertical slots within the earth and removing the earth therefrom by passing a knife edge blade perpendicularly to and at the lower extremity of the slots to thereby continuously remove an elongated rectangular disengaged portion of the earth. The bales are placed below the surface of the ground and covered with the removed earth so as to provide the ground with improved moisture retention characteristics.

FIG. 1

INVENTOR.
CHARLES WAYNE HEMPHILL
BY
MARCUS L. BATES

Patented Aug. 10, 1971

*INVENTOR.*
CHARLES WAYNE HEMPHILL
*BY*
MARCUS L. BATES

*INVENTOR.*
CHARLES WAYNE HEMPHILL
*BY*
MARCUS L. BATES

Patented Aug. 10, 1971

CHARLES WAYNE HEMPHILL

MARCUS L. BATES

INVENTOR.
CHARLES WAYNE HEMPHILL
BY
MARCUS L. BATES

Patented Aug. 10, 1971

INVENTOR.
CHARLES WAYNE HEMPHILL
BY
MARCUS L. BATES

FIG. 19

INVENTOR.
CHARLES WAYNE HEMPHILL
BY
MARCUS L. BATES

Patented Aug. 10, 1971

INVENTOR.
CHARLES WAYNE HEMPHILL
BY
MARCUS L. BATES

FIG. 21

INVENTOR.
CHARLES WAYNE HEMPHILL
BY
MARCUS L. BATES

METHOD AND APPARATUS FOR DISPOSING OF REFUSE

Humanity has seen the "stone age," "copper age," "iron age," and no doubt, when our civilization is some day excavated, it will be said that ours was the "paper age."

Primitive man simply discarded unwanted objects and there were few items that he considered to be refuse. However, he had plenty or room, and if his area became cluttered, he merely moved to a new and more desirable location. Modern man, being more affluent, is faced with disposing of his refuse since he cannot economically afford to abandon his costly home and move to a new location should he become careless with his refuse. Therefore modern man has found it expedient to devise various means of disposing of waste materials, for example, he has use of sanitary sewers for elimination of waste water, body waste, and sometimes garbage. The waste is generally carried to a central location to be processed and greatly reduced in volume, and in some instances converted into a useful and desirable product, such as a fertilizer for agriculture.

One of the overwhelming problems faced by modern man is the disposal of his own refuse. This problem is multiplying at a tremendous rate because of the population increase, the trend toward concentration of existing population, improvement in packaging in the form of disposable containers, increase in printed matter, and the general increase in the purchasing power of modern man. This increase in excess material per person has produced the complex problem of collecting and disposing of refuse, sometimes also called sanitary engineering.

The collection and disposal of refuse is a major item of expense for any community, and requires a large number of collection men and related equipment. The type of personnel required for this type work is becoming increasingly difficult to retain because of the undesirable environment in which the work must be performed. An even greater problem is the proper disposal of the refuse after it has been collected. The simplest way to dispose of refuse is to haul it to the nearest convenient hillside where it is dumped and preferably burned, thus reducing it to about one-fourth its original volume. The great quantity of refuse that is handled in this manner is unsightly, contributes to water pollution, and provides a breeding ground for insects and rodents. Sometimes the burned material is buried in a trench thereby precluding development of the land because of the detrimental effects of the burned debris. Other experiments in disposing of refuse includes incineration and dumping at sea, both of which have likewise proven undesirable.

It is therefore desirable to reduce the human element involved in the handling of refuse to a minimum and thereby lower costs. It is also desirable to mechanize and upgrade the job status of those employees associated with the collection and disposal of refuse.

It is further desirable to be able to collect refuse from a multiplicity of convenient locations in a rapid and efficient manner, and to reduce the volume of the refuse to a more compact size so as to eliminate the needless travel presently required in transporting refuse to and from the point of disposal and the point of collection.

In collecting refuse it is desirable to eliminate the direct handling of the refuse by workmen associated therewith. It is further desirable to convert unwanted refuse into a commercially valuable product, without subjecting the refuse to chemical change.

It is therefore an object of this invention to provide a method of collecting and disposing of refuse that attains the above desirable results while at the same time overcoming the above-described defects of the past art. In carrying this method into practice, a multiplicity of novel mechanical devices have been brought into existence that represents an advance over similar apparatus of the prior art.

Accordingly, a specific object of this invention is to provide a method of collecting refuse from a multiplicity of locations, whereupon the refuse is transported, compacted, and stored in a single operation, followed by burial below the surface of the ground.

A still further object of this invention is to provide various mechanisms that attain and carry into effect the method set forth above.

A still more specific object of this invention is to provide a convenient dumpable container for receiving refuse in an improved and sanitary manner.

Another object of this invention is to provide a vehicle having an automatic conveyor system associated therewith that enables refuse to be loaded from a novel container onto the vehicle by mechanical means that overcomes the necessity of manually loading the vehicle.

Another object of this invention is to provide an automatic refuse-handling device that includes a means for greatly reducing the volume of the refuse after the loose refuse has been automatically loaded onto a vehicle.

Another object of this invention is to provide a means by which compacted refuse and the like may be automatically transported from the body of a primary vehicle onto the body of a secondary vehicle.

Another object of this invention is to provide a means by which compacted refuse may be automatically conveyed from the body of a vehicle to a distant point.

Another object of this invention is the provision of an improved earthmoving device that is particularly adapted to cooperate with the remaining mechanism of the instant invention to thereby form a new combination.

Still another object of this invention is to provide a means for improving agricultural land wherein compacted refuse is placed below the surface of the earth where it decays into desirable organic material.

Another object of this invention is to provide a combination earthmoving machine and refuse-conveying system that cooperate together in a manner whereby the refuse may be placed below the surface of the earth.

Another object of this invention is to provide an improved method of moving earth.

Another object of this invention is to provide a machine for digging a ditch wherein the improved machine has means associated therewith for digging or cutting two vertical slots along the ground and further including means for removing the earth located between the two slots.

Another object of this invention is to provide a method of increasing the capabilities of farmland to retain moisture.

The above objects of this invention are attained by the provision of a refuse collection and disposal system that automatically collects, conveys, and compacts the refuse into individual bales that are subsequently stored and later transported to an open area whereupon the bales may be buried beneath the surface of the ground. In burying the bales beneath the surface of the ground, an improved earthmoving machine in cooperation with an improved conveying means cooperate together so as to simultaneously remove earth from the ground while laying the bales within the cavity formed by the removal of the earth, whereupon the earth is then redeposited on top of the bales, thereby disposing of the refuse for all eternity, while at the same time, generally improving the soil conditions of the immediate area.

It should be understood that the term refuse as herein used in this disclosure, includes all forms of garbage, trash, vegetation, and the like, such as may be expected to be deposited in the average individual's garbage disposal can that is normally located along the alleys in suburban areas, as well as waste material from commercial areas including factories where large amounts of refuse may collect at a central point.

The above and other features and objects of the invention will be best understood from the following detailed description of the illustrated embodiment found in the accompanying drawings wherein.

Figure 1:
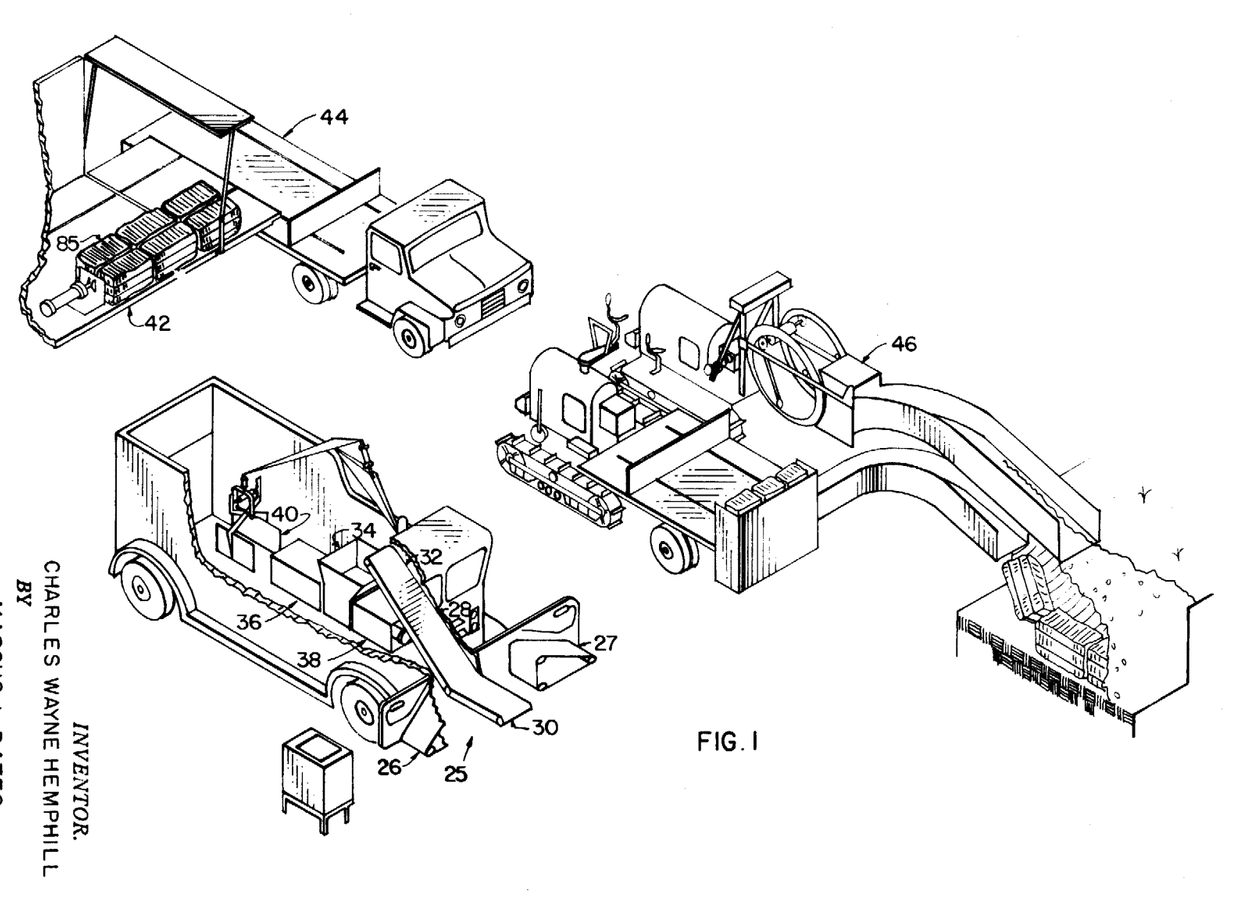
FIG. 1 is a partly schematical representation, that more or less diagrammatically illustrates the method by which refuse is collected, conveyed, compacted, transported, and buried below the level of the ground.

Looking now to the details of the various figures illustrated in the drawings, wherein like numerals refer to like elements throughout the various figures, there is seen illustrated in FIG. 1 a schematical representation in the form of a flow sheet that diagrammatically illustrates the various mechanism required in practicing the method of refuse collecting, transporting, conveying, and disposal.

Still looking at FIG. 1, there is seen illustrated therein a set of conveyors 26 and 27 that rotate in an opposite direction with respect to each other so as to force any material deposited on the top thereof to be conveyed toward and dropped upon the longitudinal conveyor 28. The longitudinal conveyor 28 is comprised of a horizontal portion 30 and an inclined portion 22 that cooperate together with the lateral conveyors 26 and 27 to ultimately transport and deposit any refuse placed upon the lateral conveyors into the hopper 34.

The hopper 34 gravity feeds the refuse into the compacting unit 36 where the refuse is greatly reduced in volume by the action of the hydraulically actuated cylinder generally illustrated by the arrow at numeral 38. After the refuse has been compacted into a suitable bale and removed by means of lifting device 40, it is then conveniently stored at 42 until a sufficient number of refuse bales 85 have accumulated to warrant storage onto the secondary vehicle 44. The secondary vehicle 44 is transported to an open field where the cargo is transferred to a third vehicle that is attached adjacent to an earthmoving device 46. The earthmoving device or vehicle 46 continually excavates an elongated cavity, or ditch, of a size to accommodate the bales. The bales are placed within the excavation in end-to-end relationship as amply illustrated in FIG. 1. The digging machine continually removes soil from the ground to provide a suitable ditch for the end-to-end arranged bales, while at the same time the removed earth is redeposited upon the bales that have been previously laid within the ditch so as to suitably cover the bales with the removed soil.

The ditches are preferably aligned along 4-foot centers and of a depth to allow the top of the bales to remain approximately 1 foot below the top surface that defines the ditch, to thereby allow normal farming operations to be carried out with no interference from the buried bales.

Looking now to the details of FIG. 2, there is seen illustrated therein a refuse collection and compaction truck 50, hereinafter called the primary vehicle. The primary vehicle 50 is preferably supported by hydraulically driven wheels having pneumatic tires 51 thereon. The arrow at numeral 52 generally indicates the interior of the vehicle body which houses the various mechanism required for carrying this portion of the invention into practice. The primary vehicle is provided with a cab 54 that constitutes an enclosure for the operator as well as the various control mechanism required for the proper operation of the vehicle. The arrow at numeral 56 indicates a hydraulically operated boom from which there is suspended the before-mentioned bale-lifting means 40.

Figures 2, 3, 4, 5, 6:
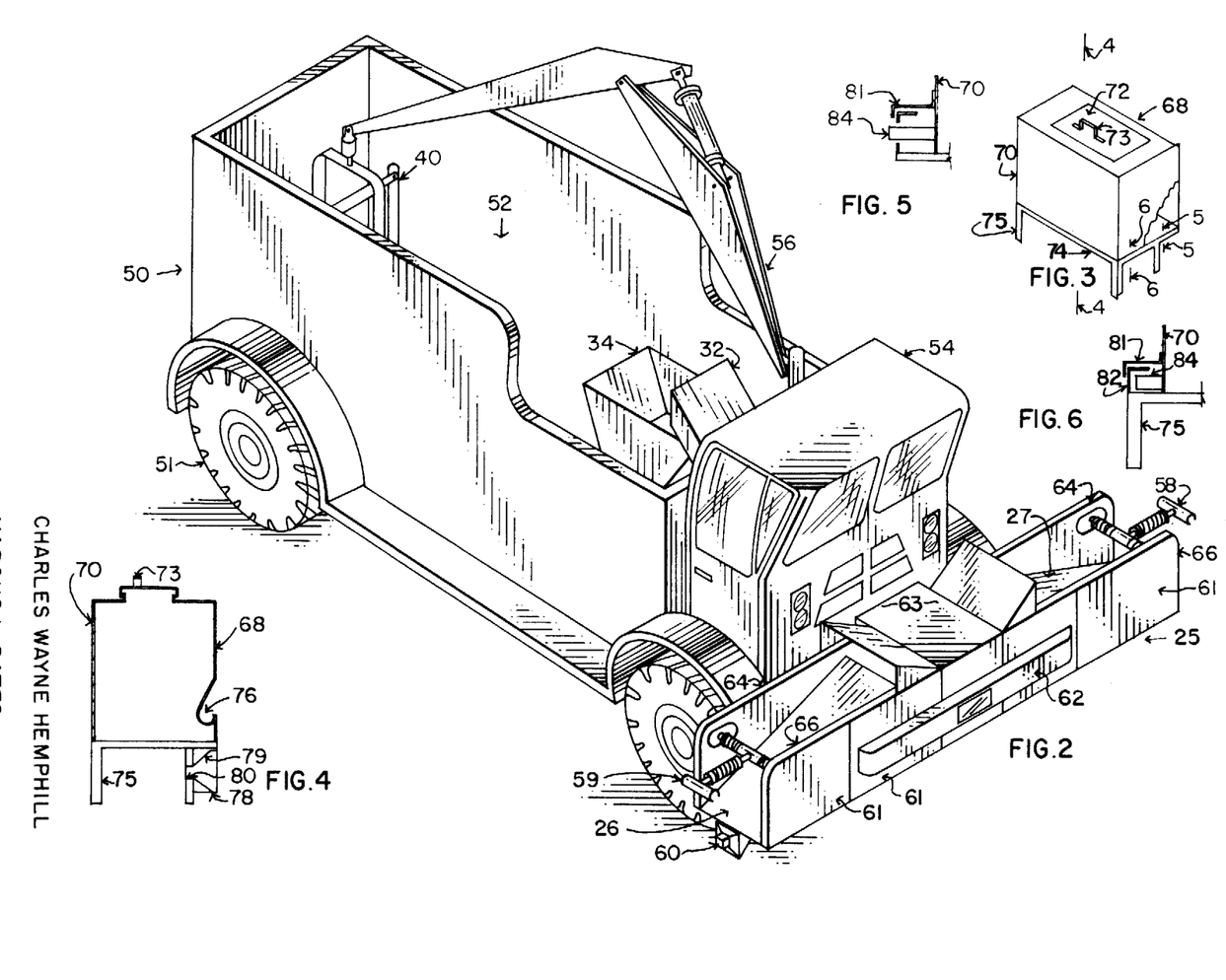
FIG. 2 is a perspective view of the primary vehicle.
FIG. 3 is a perspective view of the refuse container.
FIG. 4 is a cross-sectional view taken substantially along line 4-4 of FIG. 3.
FIG. 5 is a cross-sectional view taken along line 5-5 of FIG. 3.
FIG. 6 is a cross-sectional view taken along line 6-6 of FIG. 3, with additional details shown for clarity.

Still looking at FIG. 2, there is seen suitably suspended from the extreme forward end of the vehicle 50 the before-mentioned first conveyor assembly including the lateral conveyors 26 and 27. The first conveyor assembly is adapted to move forward and aft, as well as sideways with respect to the vehicle body, and includes a refuse container lifting and dumping device 58 and 59 and a refuse container alignment means 60, the details of which will be more fully described later on. Cover plates 61 are provided to protect portions of the conveyor mechanism located forward of the assembly as well as to add to the overall appearance of the conveyor assembly 25. A reinforced bumper 62 is mounted at the forward extremity of the conveyor cover. Numeral 63 generally indicates a top cover plate placed above the before-mentioned lateral conveyor 30. The conveyor assembly 25 includes a rear wall 64 and a forward wall 66, and between these two walls are disposed the right-hand and left-hand lateral conveyor members.

FIGS. 3, 4, 5, and 6 illustrate the refuse container that is used in conjunction with the primary vehicle. The refuse container is generally illustrated by the numeral 68 and includes an enclosure means 70 having a hinged lid 72 to which is rigidly secured a handle 73. The upper enclosure means is comprised of the illustrated top and four sidewalls that are assembled into the illustrated unitized rigid container. The bottom of the container is fabricated slightly larger than the top to thereby provide four outwardly and downwardly tapered walls that accordingly prevent refuse from "hanging up" when the container is emptied. The bottom of the container is not secured in a rigid manner to the four sidewalls, but instead is secured to the base 74. Conventional legs 75 extend from the base. One sidewall of the container is provided with a depressed contoured slot 76 that extends longitudinally and inwardly along the sidewall. Rigidly attached to the base is a socket or female alignment means 78 that includes a tapered wall 79 and depression 80. Comparing the female alignment means 78 of FIG. 4 with the refuse conveyor male alignment means 60 of FIG. 2, it will be apparent that the alignment means 60 forms a male element that is adapted to be received by the female alignment means 78, and the general configuration of one as compared to the other allows the two to mate in seating relationship with respect to each other. It will be further apparent in comparing the refuse container lifting and dumping device 59 with the longitudinally extending slot 76, that the lifting and dumping device 59 is adapted to be received within the contoured slot 76 so as to enable the first to be received within the latter.

Located about the lower periphery of the enclosure means 70 is a Z-shaped ledger plate 81 that is spotwelded onto the enclosure means in a manner to provide a suitable protective cover between the enclosure means 70 and base 74. An L-shaped rail 82 is rigidly attached to the base 74 and depends upwardly therefrom so as to provide a guide means for pin 84 while at the same time cooperating with the ledger plate 81 to permit the container to slide longitudinally with respect to the upstanding L-shaped rail 82. The pin 84 remains within the track provided by the upstanding L-shpaed rail 82 while the forwardly located pin is adapted to ride out from under the rail so as to part the bottomless enclosure means 70 from the base 74 in a hingedlike manner to thereby enable the upper portion of the refuse container 68 to part from the lower or base portion 74, thereby dumping the refuse from the container in a manner that will be explained more fully later on.

Figure 9:
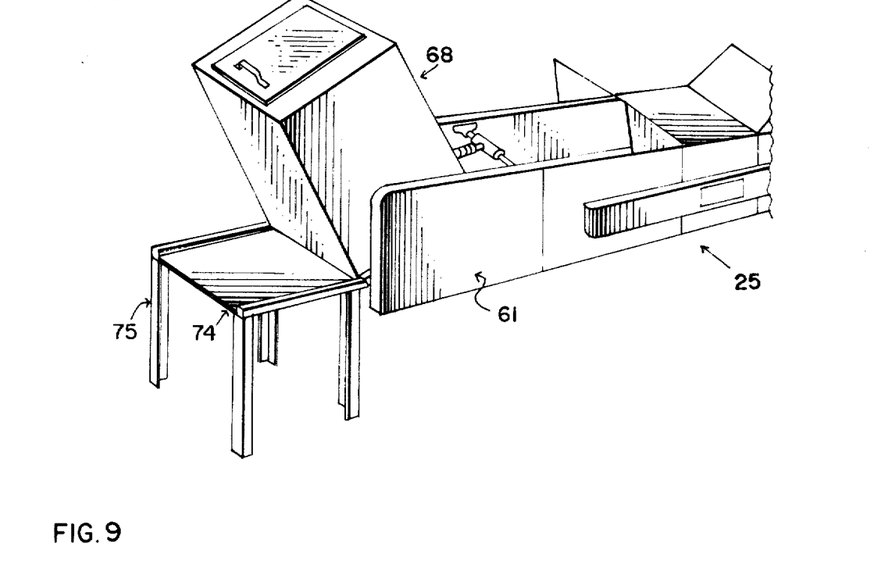
FIG. 9 is a perspective view showing the dumping position of the refuse container with respect to the conveyor assembly of the primary vehicle.

In order to completely clean the refuse container each dumping cycle, the lower marginal edge portion of the rear wall 70 that is oppositely located with respect to the forward wall portion at 76 is extended a sufficient distance to enable it to "wipe" the dumping position of FIG. 9. This wiping action is most effective when the location of pin 84 is near the rear of the base 74 and in close proximity to the lower edge portion of the rear wall so as to enable the progressive pivotal movement of container 70 about pin 84 to cause actual engagement between the lower edge portion of the rear wall and the top surface of base 74 that forms the bottom of the refuse container. The actual edge portion that "wipes" the bottom portion of the container may be a replaceable length of resilient metal that exhibits excellent wearing properties, if desired.

Since the right- and left-hand lateral conveyors are identical, for all practical purposes, the detailed explanation thereof will be restricted to the right-hand conveyor, with the understanding that the operation of the left-hand conveyor is essentially identical thereto.

Figure 7:
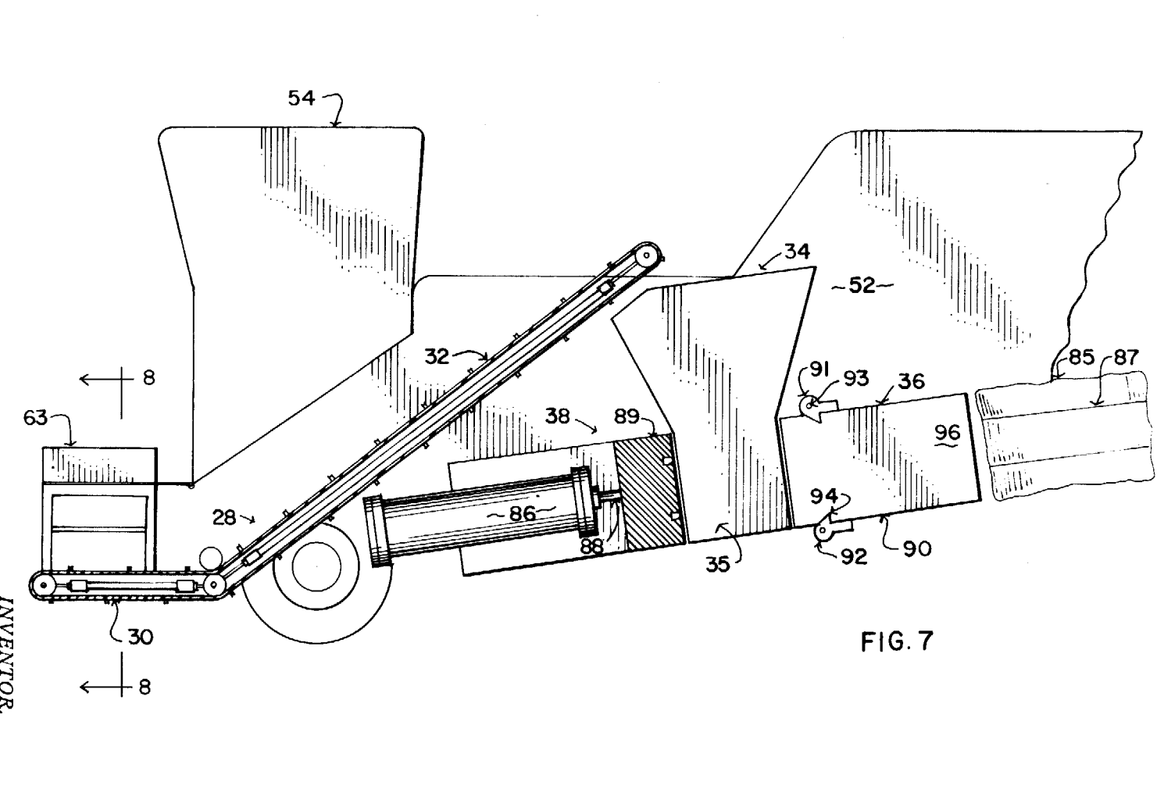
FIG. 7 is a vertical cross-sectional view taken along the longitudinal axis of the primary vehicle illustrated in FIG. 2.

Looking now to the details of FIG. 7 wherein there is disclosed the longitudinal portion of the first conveyor 25 and its operative relationship to the compactor 36 of the instant invention. As stated before, the longitudinal portion 28 of the conveyor assembly 25 is comprised of horizontal conveyor portion 30 and an inclined portion 32. The inclined portion overhangs a hopper 34 that is adapted to guide refuse into the entrance 35 of compactor 36 where the refuse is compressed into a bale 85. A hydraulic cylinder 86 is suitably mounted to the frame of vehicle 50 in a manner that enables hydraulic pressure to be applied thereto whereby piston rod 88 moves the massive compressor platform 89 into a bale mold or bale enclosure 90 of the compactor 36. This action causes the refuse contained within the compactor entrance 35 to be compressed within the enclosure 90 because of the tremendous pressure exerted upon compressor platform 89 by the hydraulic cylinder 86. Upper and lower lugs 91 and 92 are spring biased toward each other in a manner that permits lug 91 to move from the illustrated rest position, in a counterclockwise direction about its pivot pin 93, while lug 92 is adapted to rotate from its illustrated rest position, about its pivot in a clockwise direction to thereby permit the bale-engaging projection 94 to be pivoted out of the way of compressor platform 89 while at the same time preventing the compressed material forming the bale 85 from returning into the entrance 35 as the compressor platform 89 reciprocates with each increment of refuse that is being compressed into one of the bales 85. A removable gate 96 provides a removable rear wall or exit for bale enclosure 90.

The baling mechanism illustrated by numerals 34, 36, and 38 in FIG. 7 can be mounted in a stationary manner to facilitate compressing refuse at a fixed location. Such an expedient is especially desirable at plant sites where large amounts of industrial refuse accumulate within a short time.

Figure 8:
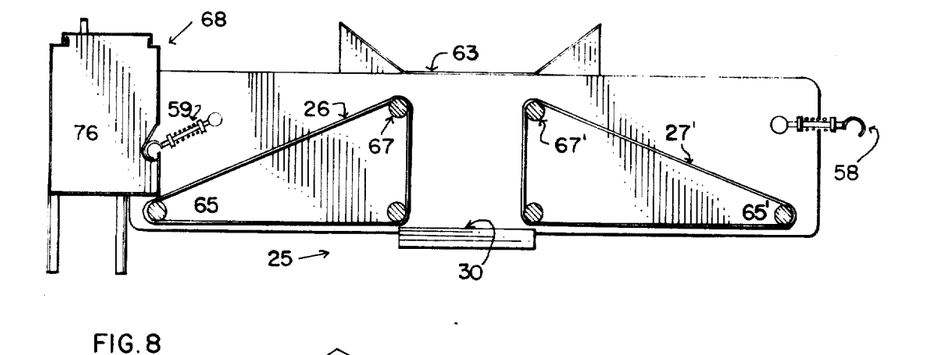
FIG. 8 is a cross-sectional view taken along line 8-8 of FIG. 7 and showing the operative relationship of the refuse container as it is automatically positioned adjacent thereto.

FIG. 8 illustrates additional details of the right-hand 26 and left-hand 27 lateral elements of the first conveyor assembly 25. The conveyor 26 is mounted for movement on idler rollers 65 and 67 that maintain the conveyor in properly tensioned relation whereby the conveyor is moved in a direction that refuse from container 68 travels in an upward direction until the refuse spills over onto horizontal conveyor element 30 of longitudinal conveyor 28. It will be noted that the conveyor has been extended into abutting relationship with the container, and that the refuse container lifting and dumping device 59 has engaged the slot 76 and commenced to pull the container 68 adjacent to the right-hand conveyor section of conveyor assembly 25.

FIG. 9 illustrates the dumping position of the refuse container 68 with respect to the right-hand conveyor element of the lateral conveyor of the first conveyor assembly 25. As seen in FIG. 9, the refuse container lifting and dumping device that had previously engaged the slot 76 has now pulled the container 68 into the dumping position whereby the contents of the container 68 flow by gravity down the sloped sides, through the bottom thereof, and onto the conveyor 26.

Figure 10:
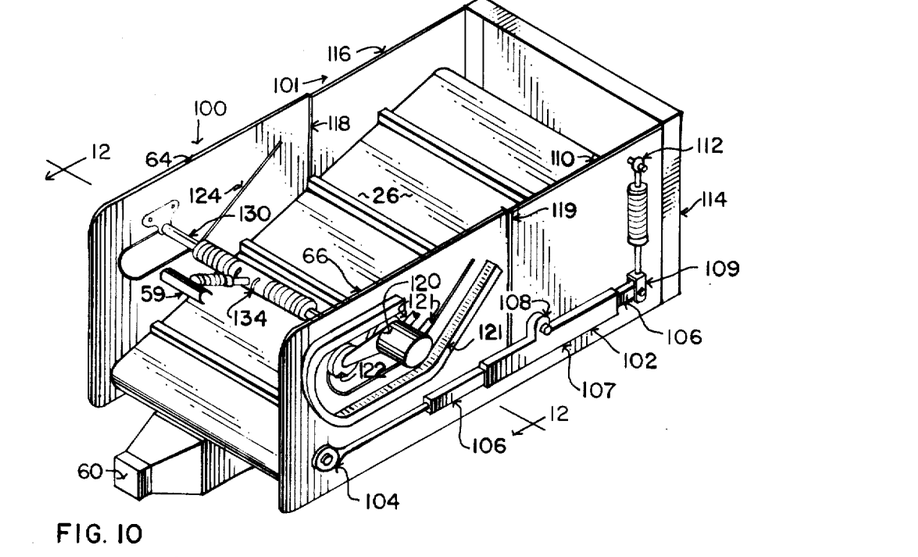
FIG. 10 is an enlarged perspective view of one side of the conveyor assembly of the primary vehicle illustrated in FIG. 2.
Figure 11:
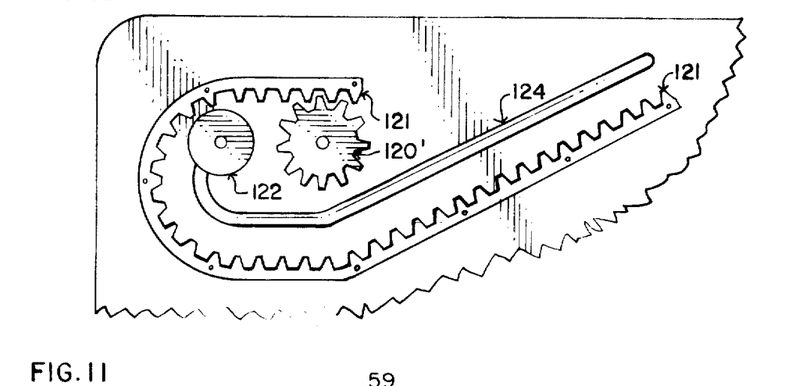
FIG. 11 is an enlarged view of a portion of the device illustrated in FIG. 10.
Figure 12:
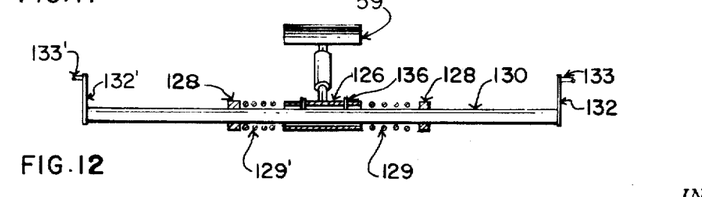
FIG. 12 is an enlarged cross-sectional view of a portion of the device seen in FIG. 10 and taken substantially along line 12-12 thereof.

FIG. 10 is an enlarged perspective view illustrating still further details of the right-hand portion of the lateral conveyor of conveyor assembly 25, and FIGS. 11 and 12 are enlarged views showing details of parts of the conveyor. The various figures illustrate the operative relationship between the right-hand lateral conveyor, and the various mechanisms therefor, and particularly the details of the manner in which the entire right-hand conveyor section may be extended into engagement with the refuse container 68.

As seen in FIG. 10 in conjunction with the remaining figures, the right-hand conveyor section is comprised of two telescoping portions 100 and 101, that are suitably arranged to permit each section to move in telescoping relationship with the other. This relationship is accomplished by means of a hydraulic cylinder (not shown) placed below the right-hand conveyor section that is arranged to permit the extension of the alignment means 60 into abutment with the before-described female alignment means 78 located on the container 68. Tension-regulating and guide means 102 maintain conveyor idler pulleys 65 and 67 sprung away from the third illustrated drive pulley. The tension-regulating means includes a pivoted shaft 104 that is telescopingly received by member 106 that in turn is telescopingly received by member 107. Member 107 is pivoted to the side 110 at pivot point 108. Member 106 extends through member 107 and into engagement with clevis pin 109 which in turn is resiliently attached to wall 110 by a pivot pin at 112. Located on the opposite wall 64 and 116 is a second tension-regulating means similar to that illustrated by the arrow at numeral 102. Wall 66 is adapted to slide within wall 110 at edge portion 119 and walls 64 and 116 are similarly arranged with respect to each other along seam 118. Hence it may be seen that walls 64 and 66 are integrally tied together in spaced-apart relationship to form a section 100 which telescopes into section 101 that is similarly formed by spaced-apart walls 110 and 116. The conveyor 26 is substantially of a width defined by the spaced-apart walls, and is maintained in proper tension by means of the tension regulator and guide means 102.

The before-mentioned refuse container lifting and dumping device 59 includes a spring-loaded arm that is provided with a reciprocal rotational motion longitudinally of the conveyor 26 by means of a hydraulic motor 120 having hydraulic inlet and outlet lines 121 suitably connected to a source of controlled hydraulic pressure (not shown). The motor 120 drives gear 120' that in turn meshes with the oval and inclined gear track 121. A forward guide means 122 rides along the outer periphery of the teeth forming the track 121 and within the slot 124 in a manner that provides a rotational reciprocal motion in accordance with the configuration of the gear track 121 and slot 124. The lifting and dumping device 59 is resiliently attached to sleeve 126 that in turn is resiliently attached to lugs 128 and 128' by springs 129 and 129'. The lug 128 is welded to the bar 130 that in turn is rigidly attached to the flange 132. Flange 132 is fastened to the motor drive assembly at 122 by means of pin 133 that is received therein, so as to travel along with the motor-driven assembly in accordance with the configuration of the track 124. Sleeve 126 is provided with elongated slots 134 that cooperate with pins 136 so as to limit the amount of rotational movement of device 59 with respect to bar 130 and in accordance with the length of the slots 134 when the bar 130 is rotated with respect to member 126. Hence motor 120 drives device 59 in an extending and downward direction followed by a retracting direction until the gear 120' reaches the extreme length of travel of gear 121.

Figure 13:
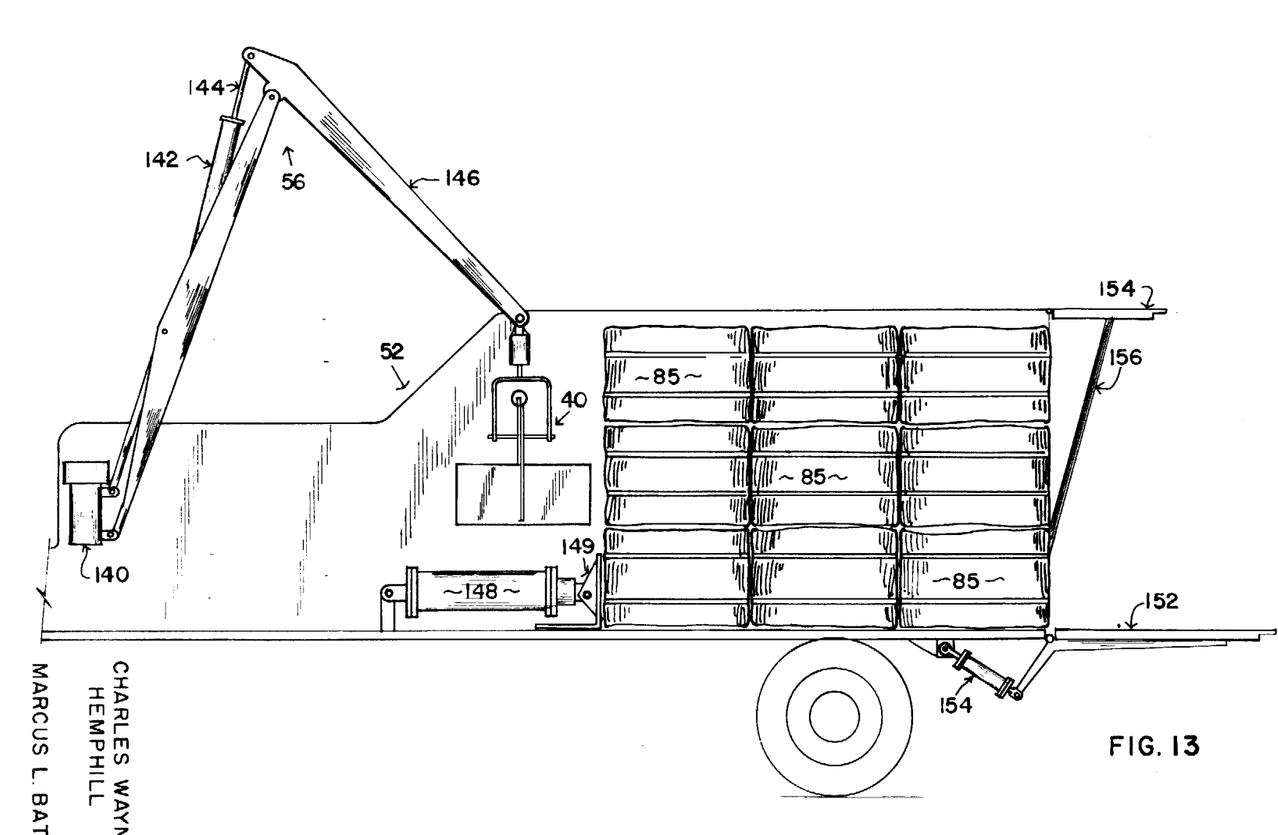
FIG. 13 is a vertical cross-sectional view taken along the longitudinal axis of the primary vehicle illustrated in FIG. 2 and showing the details of the storage area thereof.
Figures 14, 15:
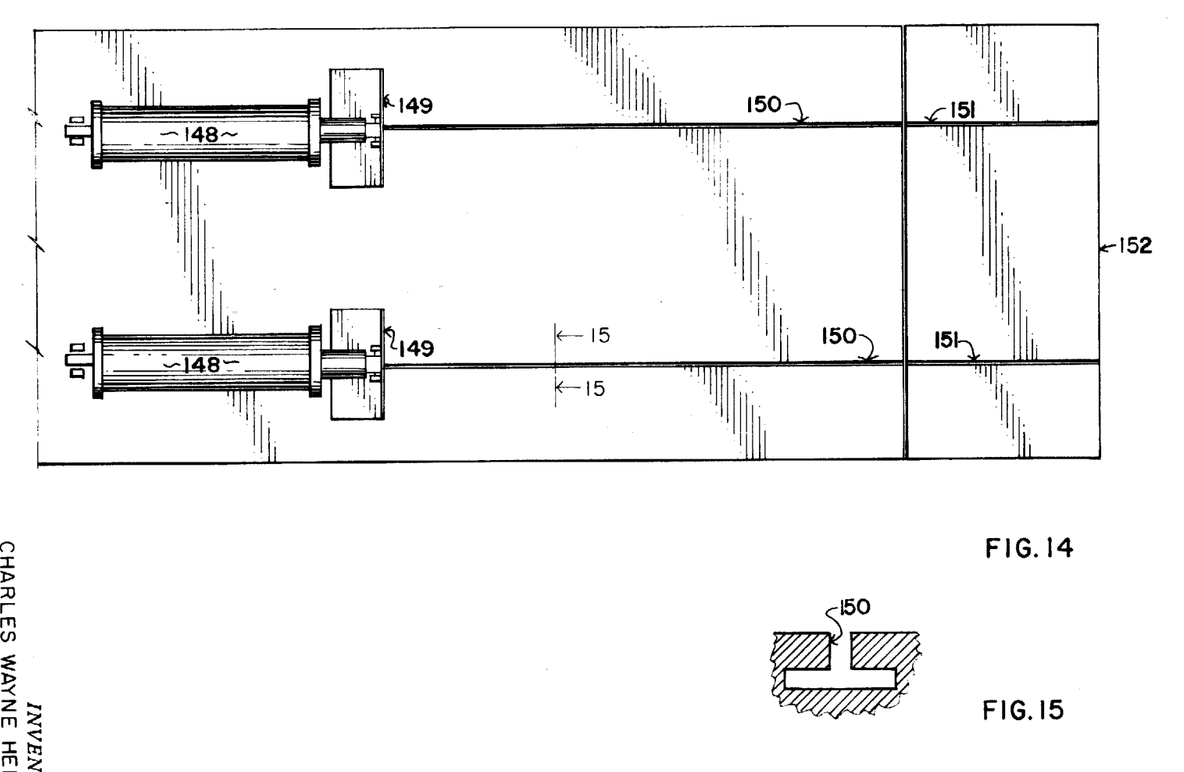
FIG. 14 is a top plan view of the storage area of the primary vehicle illustrated in FIG. 2.
FIG. 15 is a cross-sectional view taken along line 15-15 of FIG. 14.
Figure 16:
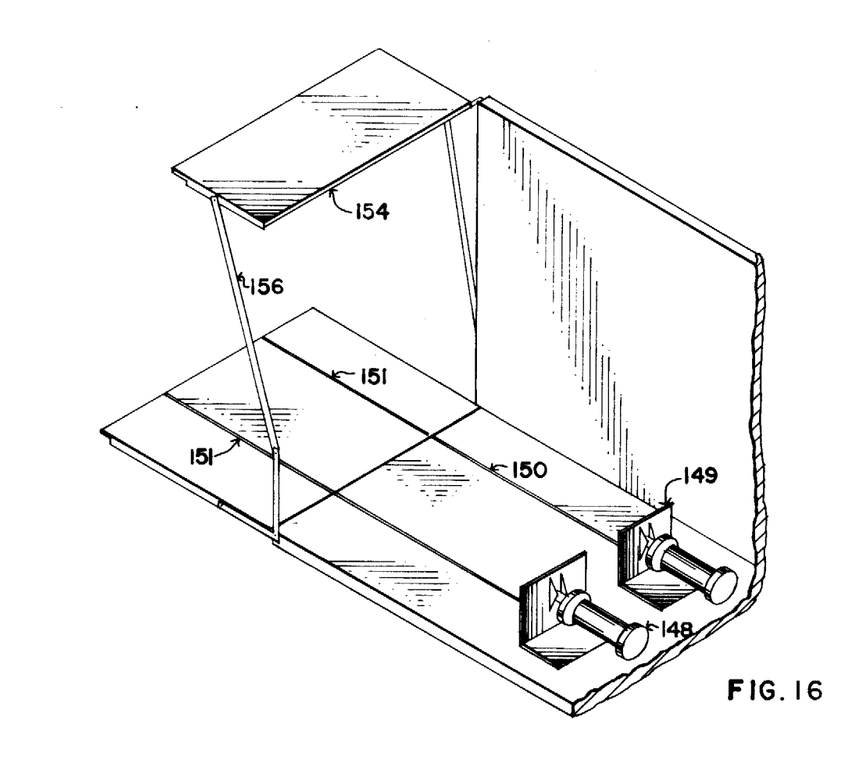
FIG. 16 is a fragmentary perspective view similar in many respects to FIGS. 13 and 14.

FIG. 13 in conjunction with FIGS. 14, 15, 16, and 17 shows additional details of the primary vehicle 50. Looking with particularity to FIG. 13, in conjunction with the remaining figures, there is disclosed therein a hydraulically operated boom 56 pivotally mounted at pivotal trunnion 140 and including a hydraulic cylinder 142 having a piston-operated shaft 144 that engages a boom 146 by means of a clevis pin. The free end of the boom 146 carries the before-mentioned bale-lifting means 40 which enables a bale to be lifted and placed in any desired location of the vehicle body 52. Rigidly mounted to the floor of the vehicle body is located a hydraulic cylinder 148 having a piston-operated ram 149 that is adapted to ride in track 150 by means of a T-shaped guide member that cooperates with a similarly shaped guide means 150 located in the floor of the vehicle. It will be noted that the guide 150 continues as a guide 151 along the tailgate 152 so as to enable the hydraulically operated ram 149 to extend from the position shown in FIG. 14 to a position near the extreme end of the tailgate 152. The length of extension of the piston rod of the hydraulic cylinder 148 is attained by employing a multiplicity of concentrically arranged pistons and shafts, the details of which are not shown since such a device is known in the art. The tailgate 152 is actuated by the hydraulic cylinder 154, with the tailgate 152 being shown in the open position in FIG. 13. The upper portion 154 is actuated by member 156 that is attached to tailgate 152 in a manner to permit operation of the gate 154 from the open to the closed position. The tailgate 152 and upper closure means 154 cooperate together to form a closed wall at the rear of the vehicle.

Figures 17, 18:
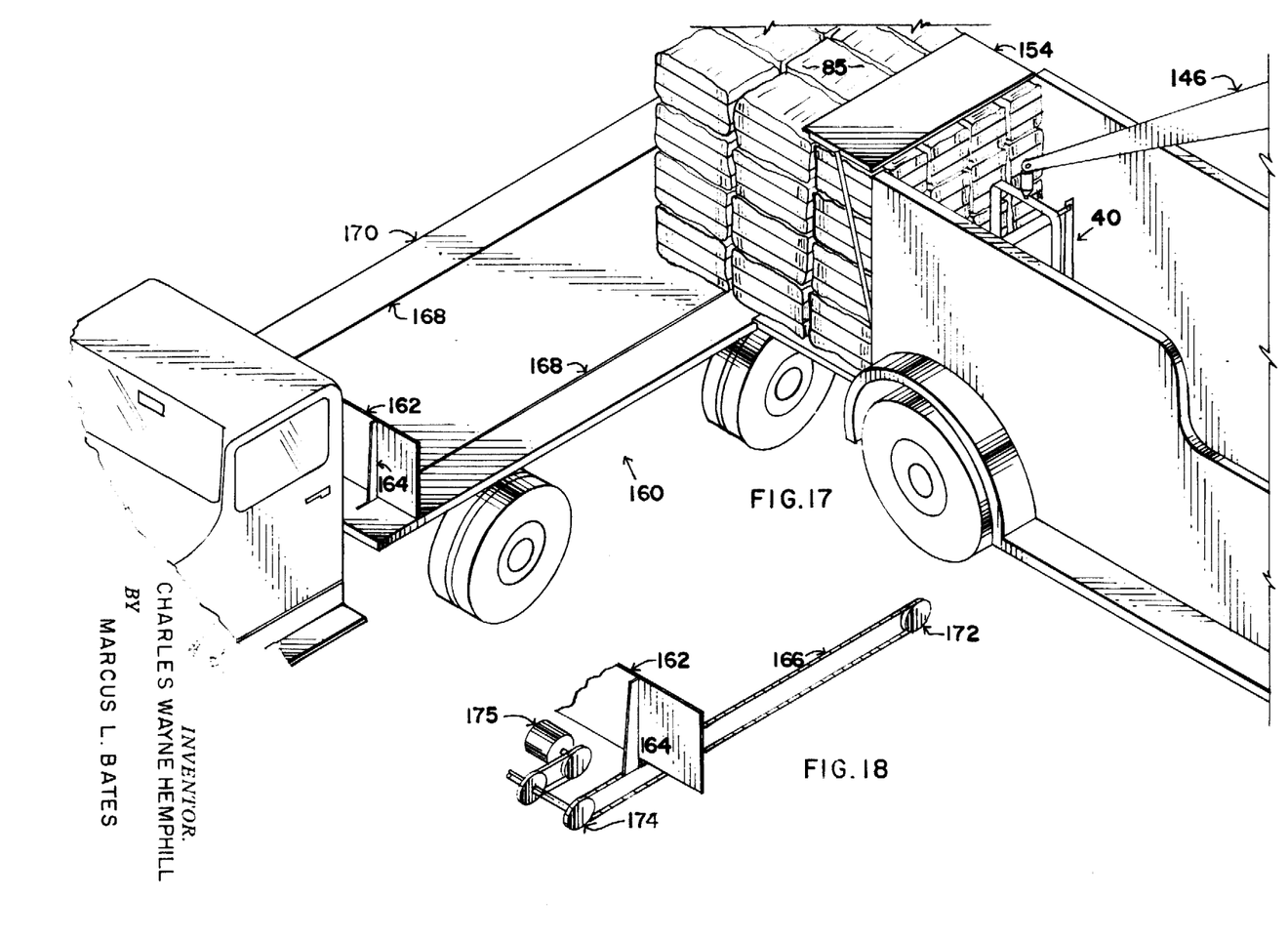
FIG. 17 is a perspective view illustrating the operative relationship of the primary vehicle of FIG. 2 with respect to a secondary vehicle.
FIG. 18 is a fragmentary perspective view showing the details of a portion of the device illustrated in FIG. 17.

The secondary vehicle is generally indicated by the arrow at numeral 160 and includes a slidable bulkhead 162 rigidly attached to a vertical member 164 which in turn is attached to a chain 166 so as to enable movement along the vehicle deck and within the slots 168 from the disclosed forward position of FIG. 17 to a rearward position. The bulkhead is adapted to move the bales 85 placed on bed 170 as a unit. Actuation of the bulkhead 162 is accomplished by the motor-driven arrangement of FIG. 18, and includes an idler pulley 172, a driven pulley 174, and a reversible motor 175. As will be evident from a comparison of FIG. 17 with FIG. 18, the motor-driven chain and drive unit therefor is advantageously located below the truck bed 170 with the member 164 rigidly attaching the bulkhead 162 to the before-mentioned chain 166.

Figure 19:
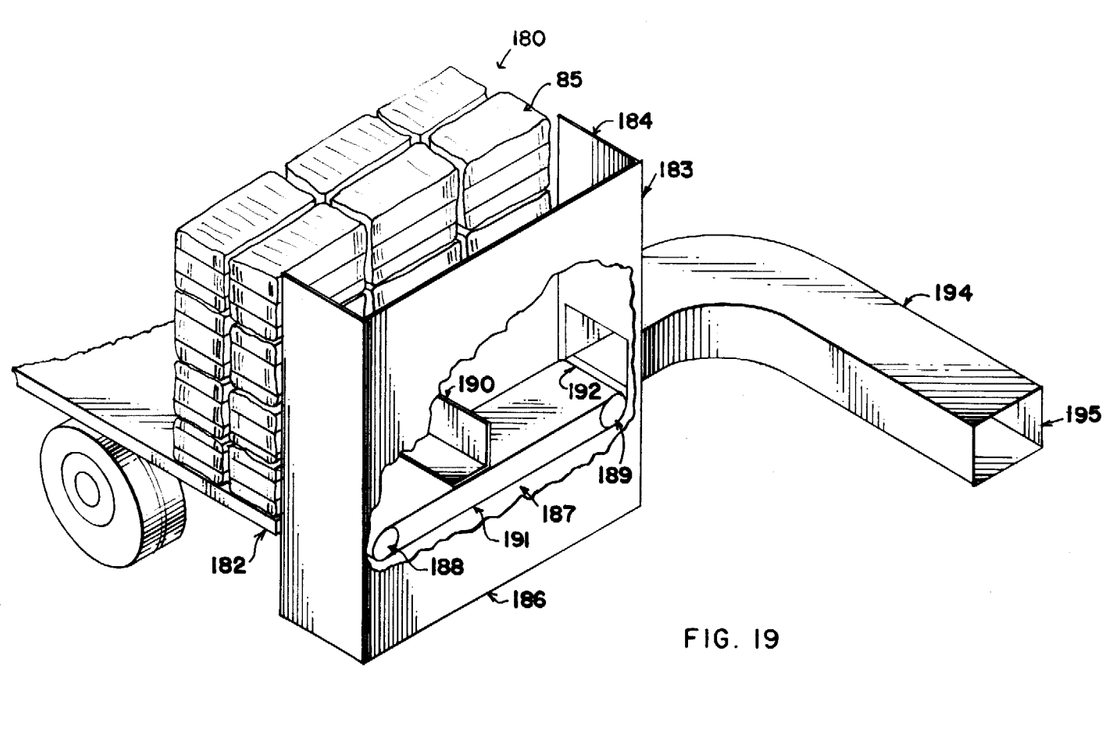
FIG. 19 is a perspective view of the secondary vehicle illustrated in FIG. 17, with some parts broken away so as to better illustrate the interior of part of the mechanism.

The baled refuse is preferably placed in the ground by the bale-feeding vehicle illustrated in FIG. 19, wherein there is additionally illustrated a vehicle bed having a bale enclosure means generally indicated by the arrow at numeral 183. The bale enclosure means includes sidewalls 184 and an end wall 186 attached together in a unitary manner to form a receptacle for receiving a multiplicity of stacked bales 85, as generally illustrated in FIG. 19. Within the bale enclosure means 183 is located a second conveyor assembly 187 including essentially two spaced-apart pulleys 188 and 189 for driving a conveyor belt 191. The conveyor belt includes an upstanding plate 190 that is suitably attached thereto whereby it rotates with the conveyor belt. Cutout 192 is of a size and configuration to permit passage of the plate 190 freely therethrough as the plate rotates with the conveyor belt, yet small enough to prevent interference between the cutout and the bales. A chute 194 having an exit 195 provides a passageway through which the bales may travel in a continuous manner so as to be placed in end-to-end relationship within the before-mentioned ditch.

Figure 20:
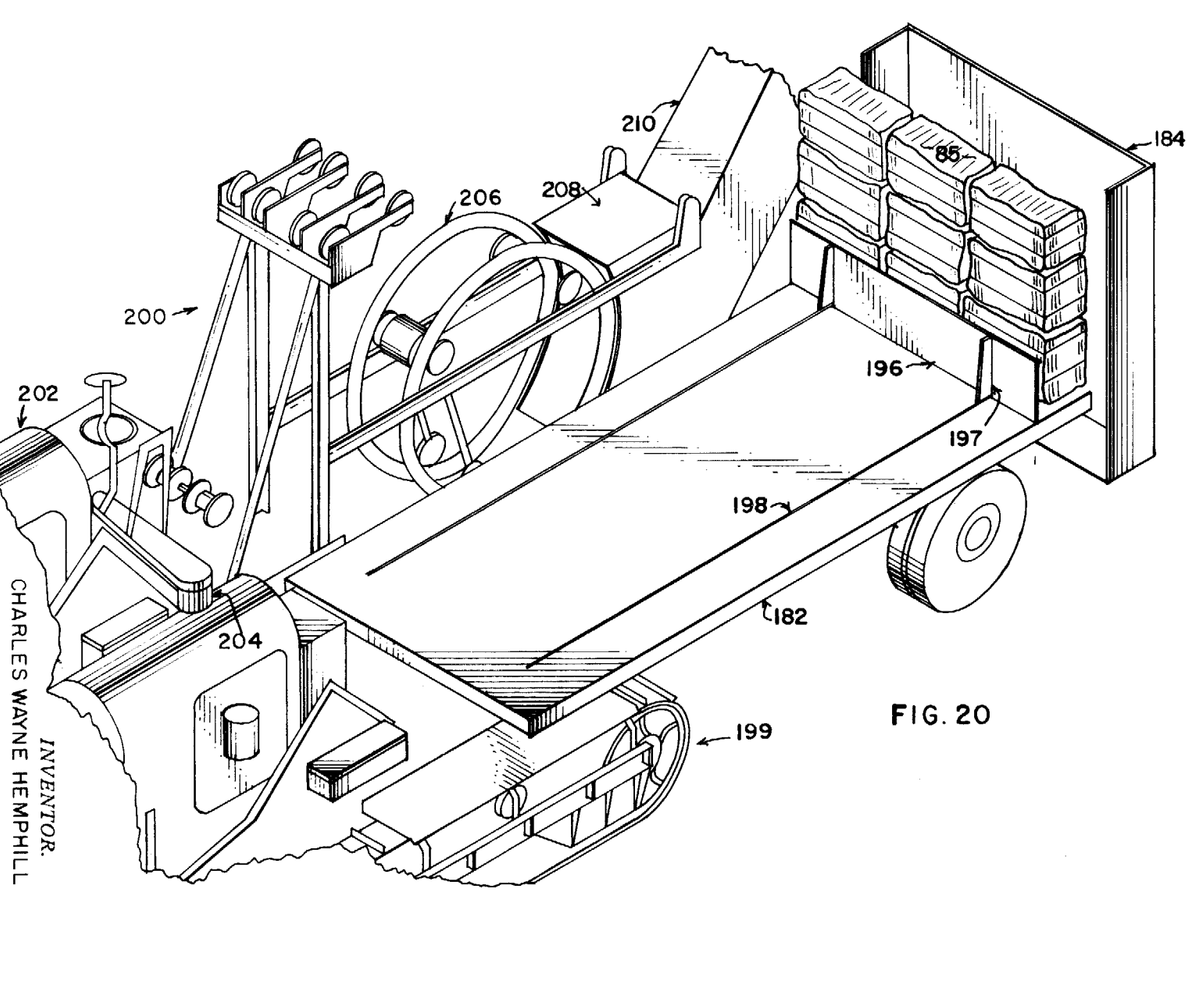
FIG. 20 is a perspective view of the secondary vehicle operatively associated with a digging machine made in accordance with the teachings of this invention.
Figure 21:
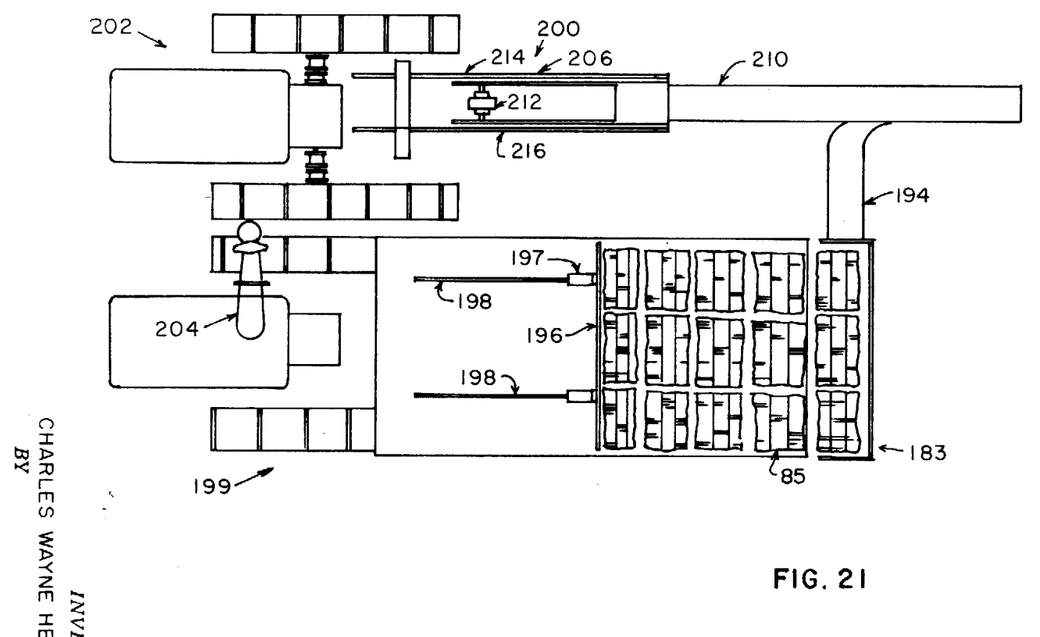
FIG. 21 is a top plan view of the mechanism illustrated in FIG. 20.

As seen in FIG. 20, the vehicle bed 182 includes a bulkhead 196 having an upstanding member 197 that cooperates with a slot 198 in a manner similar to that previously discussed in conjunction with FIG. 18. The vehicle bed is attached to a tractor 199, for example, that in turn is maintained in spaced-apart relationship to an adjacent digging machine 200.

Looking now to the details of the ditch-digging machine 200 of FIG. 20, in conjunction with the remaining figures, it is seen that the ditch-digging machine includes a power unit 202 and a seat and control unit adapted to be pivoted at 204 so as to enable an operator to exercise control over either vehicle. The digging machine includes a digging wheel assembly 206 comprised of two spaced-apart digging wheels, 214 and 216, and a shovel arrangement at 208. Rearwardly mounted and in communication with the shovel is a chute 210 that is adapted to convey the dirt as it is removed by the action of the digging wheels and shovel. A variable speed motor 212 is suitably connected in driving relationship to the digging wheel assembly 206. The digging wheels are maintained in properly aligned spaced-apart relationship by the idler gears 218 and 220, and the drive gear 217 which is connected to the before-mentioned variable speed motor 212.

Figures 22, 23, 24, 25:
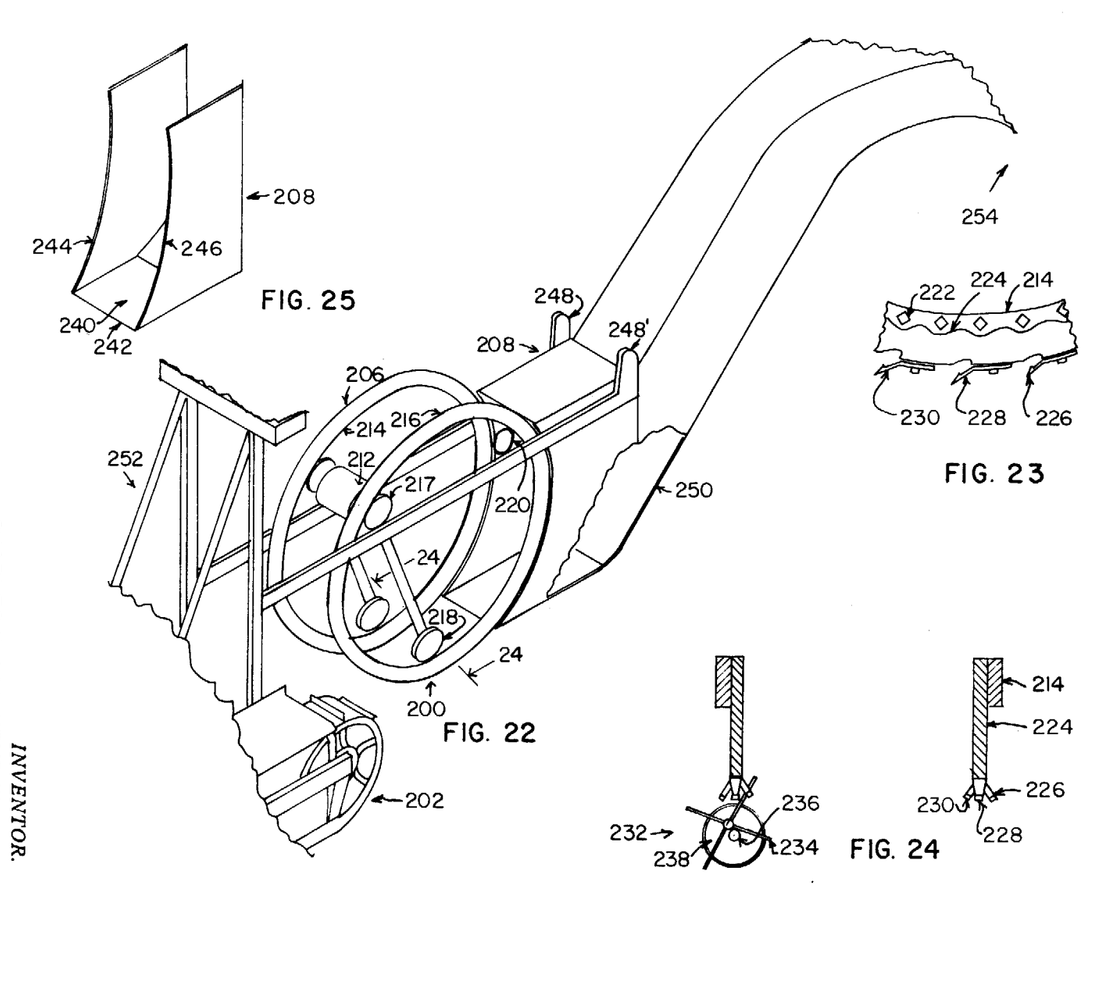
FIG. 22 is a perspective view of the digging machine illustrated in FIGS. 20 and 21, with some parts broken away to better illustrate the device.
FIG. 23 is an enlarged fragmentary view of a portion of the device illustrated in FIG. 22.
FIG. 24 is a cross-sectional view taken substantially along line 24-24 of FIG. 22.
FIG. 25 is a perspective view of part of the device illustrated in FIG. 22.

As seen in FIG. 23, the inside periphery of each digging wheel is suitably provided with a gear arrangement 222 placed above detent 224 so as to enable drive gear 217 to engage the wheel in meshed relationship therewith. The digging teeth that remove the earth from the ground are circumferentially disposed about the outer periphery of each digging wheel, and include spaced-apart teeth 226, 228, and 230. The tooth 226 extends outwardly from the plane formed by the digging wheel, the tooth 228 is essentially aligned in the same plane defined by the digging wheel, and the tooth 230 is sprung to the inside of the digging wheel, all in a manner as illustrated in FIGS. 23 and 24. Thus it may be seen that each fourth tooth of the consecutively arranged but spaced-apart adjacent teeth are identical in geometrical configuration.

A brush or cleaning assembly 232 is placed adjacent each digging wheel and includes resilient brush elements 234, attached to a rotatable drum 238 that is journaled on a shaft 236. The drum 238 is driven by conventional means and is placed to cause the resilient brush elements 234 to sweep across the digging teeth that are located on the outer periphery of the wheels. This action of the brush prevents the digging teeth from becoming clogged with dirt.

The shovel 208 has a bottom plate member 240 that includes a cutting edge 242 disposed at the forward extremity thereof. Side 244 of the shovel is suitably contoured in the illustrated manner whereby it may be placed immediately behind and in close proximity to the wheel 214, while side 246 is similarly contoured so that it may likewise be placed immediately behind its respective cutting wheel 216. The shovel is adjustably attached to the supporting framework 252 and provided with lifting eyes 248 and 248' to enable the entire digging assembly to be positioned in optimum relationship with respect to the power unit 202. The chute 210 has a contoured portion 250 attached to the shovel 208 which receives the earth that is removed by the joint action of the digging wheel and shovel. The chute 210 includes an outlet 254 that is spaced apart from the shovel 208 so as to allow a suitable time interval and distance prior to the dirt being redeposited into the ditch which is simultaneously being dug by the mechanism 206 and 208.

Having now described the various novel mechanism and devices, as set forth in detail above so as to enable others to practice my new method of refuse collection, compaction, and disposal, it should be understood that in carrying this method into practice, the conveyor assembly 25 is adjustably mounted forwardly of the specially designed vehicle 50. The conveyor assembly is directionally adjustable to allow it to be extended in a forward direction as well as a lateral direction, to thereby enable the vehicle 50 to be driven into close proximity of a refuse container 68, whereupon the conveyor assembly 25 may then be positioned by hydraulic control means so as to permit engagement of the alignment means 60 with the socket 78 of a refuse container 68. As illustrated in FIG. 2, the vehicle 50 is adapted to unload the refuse container 68 from either or both sides of the vehicle.

After the vehicle is properly positioned with the conveyor assembly 25 in close proximity to the refuse container 68, the refuse container lifting and dumping device 59 travels toward the container 68 with a forward and downward motion whereupon element 59 engages the slot 76 in a manner particularly illustrated in FIG. 8, whereupon continued motion of element 59 slides the container 68 partially off its base 74 and into the position illustrated in FIG. 9, thereby permitting the contents of the container 68 to be dumped upon the conveyor belt 26. The hydraulic motor 120 is preferably provided with forward and backward interlocked limit switches and control circuitry whereby the above described manipulation may be carried out by a single operator of the vehicle 50, merely by activating the system that in turn automatically accomplishes the dumping operation of container 68. After the contents of container 68 have been dumped, the motor 120 is reversed whereupon element 59 travels back to the original position of FIG. 10, and during this return travel of the lifting and dumping device 59, the empty container 68 is replaced in its original position upon the base 74, where it is again ready to receive refuse. The operator of the vehicle 50 may now travel to the next location of refuse container 68 whereupon the before-described operation is repeated.

As the refuse is dumped upon the conveyor belt 26 or 27, it will be noted that the belt travels in a direction to dump the refuse onto the horizontal conveyor 30, where the refuse then travels up the inclined conveyor 32 and is subsequently dumped by gravity into the hopper 34. As the refuse accumulates in hopper 34, hydraulic cylinder 86 is activated to thereby actuate the reciprocating compressor platform 89 that in turn travels up into the bale enclosure 90, thereby compressing the refuse that was previously contained within the hopper 34. The refuse is reduced in volume approximately 20 times, or to a near solid state, so as to enable the refuse to retain its molded shape which greatly facilitates disposal thereof as well as giving the refuse the desirable properties required in practicing this invention. To impart a high density of this degree to the refuse, it is necessary to compress the refuse with sufficient pressure to cause it to lose its natural resiliency or tendency to return to its original shape. Cans, boxes, bottles, and plastic cartons are either broken into small fragments or compressed to the smallest possible volume. Several strokes of the compressor platform 89 are required to build a bale 85 of the desired size and density set forth above. Upper and lower lugs 91 and 92 hold each increment of refuse during each reciprocation of the compressor platform 89 until a bale has been formed within the bale enclosure 90 of a suitable size whereupon the bale is then provided with either a metallic or composition band 87 that holds the compressed refuse in a convenient rectangularly shaped bale. It is within the comprehension of those skilled in the art to provide automatic tying means of this nature, as for example, an automatic tying means associated with an automatic hay-baling machine.

As the bales 85 are formed, the operator of the vehicle 50 actuates hydraulic crane 56 and properly stores the bales 85 in a convenient manner as illustrated in FIGS. 13 and 18. The hydraulic-operated boom 56 includes the hydraulically actuated horizontal-positioning means 140 and the vertical-positioning means 142 as well as the bale-lifting means 40. As the storage area of the primary vehicle becomes filled with bales 85, the bales are automatically loaded onto a secondary vehicle having a flat bed 170. The transfer of the bales is best accomplished by means of the hydraulic cylinders 148 that actuate the hydraulic ram 149 that in turn pushes the bales along the floor of the primary vehicle and off the tailgate 152, and onto the secondary vehicle 160. This operation is best accomplished by the hydraulic cylinders 148 having telescoping pistons therein that enable the hydraulically actuated ram 149 to travel in the track 150 and 151 to the end of the tailgate 152, allowing all of the bales 85 to be transferred onto the secondary vehicle as a unit, in a manner as amply illustrated by FIG. 17. The secondary vehicle 160 is provided with the movable bulkhead 162 that is adapted to transfer the load from the bed 170 onto still another vehicle. The bulkhead 162 is rigidly attached to upstanding member 164 that in turn is rigidly attached to a chain 166 and suitably provided with a geared reversible motor 175 to thereby permit longitudinal travel of the bulkhead 162 that transfers bales 85 from the bed 170 of the secondary vehicle onto the bed 182. Hence it may be seen the applicant's novel device has, at this point, transformed loose refuse into compact bales and transported the bales to a suitable storage area by automatic means, with each operation requiring the attention of a single operator.

The vehicle bed 182 is provided with a conveyor system that automatically transfers the bales 85 from the third vehicle bed 182 through a chute 194 to where the bales exit at 195. The purpose of the third vehicle is to automatically place the bales in end-to-end relationship within a ditch that has previously been provided in the ground. As will be noted in FIG. 19, the conveyor system includes a traveling conveyor belt 191 that is of a width and length to accommodate three bales 85. The bales 85 are transferred to the conveyor system by a track and bulkhead arrangement 198 and 196 that is similar in operation to the before described track and bulkhead 168 and 162 of the secondary vehicle. Accordingly, the entire load of bales 85 that is stored on a vehicle bed 182, is moved as a unit toward enclosure 183 by the actuation of bulkhead 196 that in turn maintains a continuous supply of bales 85 within the enclosure 183. Rotation of the conveyor belt 191 permits the plate 190 to move a single line of three bales into the chute 194. Each stack of bales 85 is bottom loaded into the chute 194 in accordance with the rotation of the plate 190 that moves in conjunction with the conveyor belt 191. This system allows the secondary vehicle to continually replenish the supply of bales 85 on the bed 182 of the third vehicle. The third vehicle is maintained adjacent to and spaced apart from the digging machine 200, by providing the digging machine 200 and the vehicle 199 with integrated hydraulic controls that enables one operator to carry out the disposal operation. As seen in FIG. 20, the operator is provided with a swinging seat and control unit that is pivotally mounted at 204 so as to enable him to exercise control over both vehicles 200 and 199 at the same time.

The ditch-digging machine 200 includes a power unit 202 that moves the vehicle longitudinally of the desired ditch that is being dug. Rearwardly mounted onto the power unit 202 are the disclosed digging wheels fabricated in accordance with the instant invention, and including two spaced-apart digging wheels 214 and 216, each having a gear arrangement about the inside peripheral surface of the wheel that enables rotation thereof by means of the motor 212. Each digging wheel is maintained in proper spaced-apart relationship with each other by the idler gears 218 and 220 as well as the driving gear 217 so that rotation of driving gear 217 imparts rotational movement to the digging wheel assembly 206.

Each wheel 214 and 216 digs or cuts two spaced-apart slots, or narrow trenches, approximately 2 inches wide and 24 inches apart by the action of the teeth that are suitably spaced about the outer periphery of each digging wheel. Placed immediately behind the digging wheel 206 is a shovel 208 having sidewalls 244 and 246 contoured similarly to the contour of the outside periphery of each individual digging wheel 214 and 216. This construction enables each plate forming a sidewall of the shovel to be placed where it may travel along immediately behind the digging wheel assembly 206 and within the slots formed in the earth.

Stated differently, the upstanding vertical plates of shovel 208 are positioned in a suitable manner immediately behind the wheel assembly 206 so as to fill the narrow vertical trenches dug by the action of wheels 214 and 216. The lowermost horizontal portion of the ditch is formed by the horizontal plate member 240 having a tempered knife edge 242 at the leading edge thereof that facilitates the cutting action of the plate. Hence the shovel 208 may be said to cut loose and lift a continuous body of earth that is more or less rectangular in cross section. The removed earth is forced through the shovel 208 and into the lower portion 250 of chute 210 where it exits at 254. The interval of time and the distance between digging wheels 206 and exit 254 is of a suitable time and distance to permit the third vehicle to lay the bales 85 into the ditch in end-to-end relationship prior to the excavated earth exiting from 254 and covering the bales. Accordingly, the side-mounted third vehicle lays a continual string or line of bales into the ditch which was previously dug at 206 and covered at 254.

The digging wheel is maintained in a substantially clean condition by the rotating brush assembly 232 in order that the digging wheels may operate at their optimum efficiency. The optimum rotational velocity of the digging wheels 214 and 216 depends upon the soil condition encountered, and accordingly, its speed may be adjusted by controlling the speed of motor 212.

The ditches are laid on 4 centers and dug to a depth whereby the top of the bales, when placed therein, is located 1 foot below the normal surface of the ground. The buried refuse provides an excellent underground sump or water retention means. Approximately 10 years are required for complete deterioration of the refuse by the chemical action that occurs between the refuse and the ground contained chemicals. Plant life profits from the presence of the refuse both in the improved moisture conditions and in the fertilizing effects of the organic matter produced by the decaying refuse. Hence it is apparent that the refuse, which heretofore has been an enormous disposal problem, has now been converted into a desirable product from an agricultural point of view. In addition to these desirable attributes of the buried compressed refuse, the land is "built up," not only from the physical presence of the compressed bales, but also as a result of the excavation precess which loosens the soil in addition to bringing up new topsoil in a manner analogous to deep plowing.

Other advantages of applicant's method of disposing of refuse includes the improved refuse container that forms a part of this invention. The new container may be fabricated of a larger size than has heretofore been possible since manual dumping has been eliminated. The container base may be set in concrete within the ground to eliminate damage from the elements as well as animals. The container, when constructed in accordance with this invention, will endure for years since weight is no longer of primary importance, and thus the container may be rugged in construction.

The primary vehicle is preferably hydraulically operated so as to enable ample room for the longitudinal conveyor since the prime mover driving the hydraulic pumps may be mounted in any desired position within the vehicle framework. Furthermore, by hydraulically driving the wheels of the vehicle, the conventional drive train is eliminated. Since the operator of the vehicle is not required to directly handle the refuse, the cab of the vehicle is made comfortable and pleasant so as to increase the efficiency and reliability of the operator thereof. The cab of the vehicle is fabricated in a manner that enhances visibility and enables the operator to maintain a safe surveillance over the entire collection operation.

While there is set forth herein, for the purpose of illustration, a single embodiment by which applicant's invention may be carried out, it will be understood that others skilled in the art will envision various changes that can be made in the different combinations and subcombinations, other than those suggested above, and still realize the advantages of the present invention illustrated and described herein. Therefore it is to be understood that the specific forms of the invention illustrated and described herein merely serve for the purpose of illustration.

What I claim is:

1. A method of collecting and disposing of refuse comprising the steps of:
   1. collecting refuse from a multiplicity of collection stations;
   2. conveying the refuse to a compacting device and subjecting the refuse to sufficient pressure to reduce the refuse to a multiplicity of compact bales,
   3. digging two parallel spaced-apart vertical slots within the earth with the slots being spaced apart from each other a sufficient distance to enable the compact bales of step (2) to be received therebetween;
   4. passing a knife edge plate perpendicularly to and at the lower extremity of the slots to thereby continuously form an elongated rectangular disengaged portion of the earth;
   5. continuously removing said disengaged portion of earth from the ground and conveying said removed earth in a direction away from the knife edge to thereby provide a storage area below the surface of the earth for the bales;
   6. storing the bales below the surface of the ground;
   7. covering the bales with the previously removed earth to thereby provide the ground with improved moisture retention characteristics.

2. A method of improving farmland comprising the steps of:
   1. digging a cavity below the surface of the land;
   2. carrying out step (1) by cutting two narrow vertical spaced-apart ditches followed by the step of continuously removing the earth from between the ditches as a continuous rectangular mass so as to provide an excavation substantially defined by the depth and width of the spaced-apart ditches;
   3. collecting and compressing refuse so as to provide a compact mass having improved handling characteristics;
   4. placing the compacted mass of refuse in end-to-end relationship within said cavity;
   5. covering the refuse located within the cavity with the earth obtained in steps (1) and (2).